United States Patent
Igarashi

(10) Patent No.: US 12,437,015 B1
(45) Date of Patent: Oct. 7, 2025

(54) OBJECT IDENTIFICATION AND SEARCH RANGE ADJUSTMENT METHOD AND APPARATUS

(71) Applicant: TOYOTA JIDOSHA KABUSHIKI KAISHA, Aichi-ken (JP)

(72) Inventor: Ryo Igarashi, Chofu (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 18/748,026

(22) Filed: Jun. 19, 2024

(51) Int. Cl.
*G06F 16/9537* (2019.01)
*G06F 16/29* (2019.01)
*G06F 16/9538* (2019.01)

(52) U.S. Cl.
CPC .......... *G06F 16/9537* (2019.01); *G06F 16/29* (2019.01); *G06F 16/9538* (2019.01)

(58) Field of Classification Search
CPC ... G06F 16/9537; G06F 16/9538; G06F 16/29
USPC ................................................ 707/705, 707
See application file for complete search history.

(56) References Cited

U.S. PATENT DOCUMENTS

| | | | | |
|---|---|---|---|---|
| 5,751,364 | A * | 5/1998 | Yasuda | H04N 19/51 375/E7.102 |
| 2015/0199019 | A1* | 7/2015 | Steers | B60K 35/80 348/148 |
| 2020/0132482 | A1* | 4/2020 | Beaurepaire | G08G 1/143 |
| 2021/0012151 | A1* | 1/2021 | Yasuda | G06V 10/46 |
| 2021/0319237 | A1* | 10/2021 | Kim | G06V 10/755 |

FOREIGN PATENT DOCUMENTS

JP 2021-163988 A 10/2021

* cited by examiner

*Primary Examiner* — Baoquoc N To
(74) *Attorney, Agent, or Firm* — HAUPTMAN HAM, LLP

(57) ABSTRACT

A method includes processing an inquiry to identify an object outside a vehicle, wherein the inquiry is made by an occupant of the vehicle. The method also includes determining a direction of occupant focus at a time of receiving the inquiry. The method further includes detecting a quantity of lanes of a road upon which the vehicle is travelling. The method additionally includes setting one or more search areas extending from the vehicle in response to the inquiry and based on a determined quantity of lanes between the vehicle and a side of the road, wherein the side of the road is ahead in the direction of occupant focus. The method also includes causing one or more geographical fences corresponding to the one or more search areas to be set with respect to the vehicle on a geographical map in response to the inquiry.

20 Claims, 5 Drawing Sheets

OBJECT IDENTIFICATION AND SEARCH RANGE ADJUSTMENT METHOD AND APPARATUS

BACKGROUND

Device manufacturers and vehicle manufacturers are continually challenged to provide products and services that offer value and convenience to users such as vehicle occupants. Vehicle occupants often see objects or points of interest from a vehicle when driving and inquire what those objects or points of interest are. Some vehicles have infotainment or navigation systems that utilize onboard cameras and/or sensors that capture a gesture made by a vehicle occupant and/or that track a vehicle occupant's eye movements.

SUMMARY

An aspect of this description relates to a method. The method comprises processing an inquiry to identify an object outside a vehicle, the inquiry being made by an occupant of the vehicle. The method also comprises determining a direction of occupant focus at a time of receiving the inquiry. The method further comprises detecting a quantity of lanes of a road upon which the vehicle is travelling. The method additionally comprises setting one or more search areas extending from the vehicle in response to the inquiry and based on a determined quantity of lanes between the vehicle and a side of the road, wherein the side of the road is ahead in the direction of occupant focus. The method also comprises causing one or more geographical fences corresponding to the one or more search areas to be set with respect to the vehicle on a geographical map in response to the inquiry. The method further comprises searching map data associated with the geographical map to identify a candidate object of interest within the one or more geographical fences. The method additionally comprises searching a database for information about the candidate object of interest within the one or more geographical fences. The method also comprises generating an output in response to the inquiry comprising the information about the candidate object.

An aspect of this description relates to an apparatus. The apparatus includes a processor and a memory having instructions stored thereon that, when executed by the processor, cause the apparatus to process an inquiry to identify an object outside a vehicle, the inquiry being made by an occupant of the vehicle. The apparatus is also caused to determine a direction of occupant focus at a time of receiving the inquiry. The apparatus is further caused to detect a quantity of lanes of a road upon which the vehicle is travelling. The apparatus is additionally caused to set one or more search areas extending from the vehicle in response to the inquiry and based on a determined quantity of lanes between the vehicle and a side of the road, wherein the side of the road is ahead in the direction of occupant focus. The apparatus is also caused to cause one or more geographical fences corresponding to the one or more search areas to be set with respect to the vehicle on a geographical map in response to the inquiry. The apparatus is further caused to search map data associated with the geographical map to identify a candidate object of interest within the one or more geographical fences. The apparatus is additionally caused to search a database for information about the candidate object of interest within the one or more geographical fences. The apparatus is also caused to generate an output in response to the inquiry comprising the information about the candidate object.

An aspect of this description relates to a non-transitory computer readable medium having instructions stored thereon that, when executed by the processor, cause an apparatus to process an inquiry to identify an object outside a vehicle, the inquiry being made by an occupant of the vehicle. The apparatus is also caused to determine a direction of occupant focus at a time of receiving the inquiry. The apparatus is further caused to detect a quantity of lanes of a road upon which the vehicle is travelling. The apparatus is additionally caused to set one or more search areas extending from the vehicle in response to the inquiry and based on a determined quantity of lanes between the vehicle and a side of the road, wherein the side of the road is ahead in the direction of occupant focus. The apparatus is also caused to cause one or more geographical fences corresponding to the one or more search areas to be set with respect to the vehicle on a geographical map in response to the inquiry. The apparatus is further caused to search map data associated with the geographical map to identify a candidate object of interest within the one or more geographical fences. The apparatus is additionally caused to search a database for information about the candidate object of interest within the one or more geographical fences. The apparatus is also caused to generate an output in response to the inquiry comprising the information about the candidate object.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
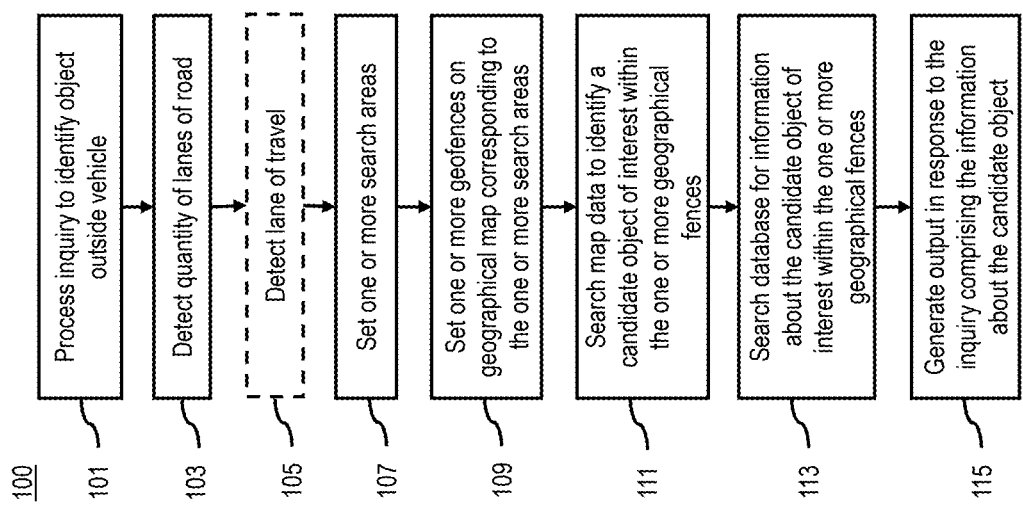
FIG. 1 is a flowchart of a method of for adjusting a search range for identifying objects of interest to an occupant of a vehicle, in accordance with one or more embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Vehicle occupants often see objects or points of interest from a vehicle when driving and inquire what those objects or points of interest are. Some vehicles have infotainment or navigation systems that are capable of searching for addresses associated with a place of interest based on a user input. Some infotainment or navigation systems have one or more displays, navigation capabilities, and receive a user input from a vehicle occupant by way of touch screen(s), microphone(s), button(s), knob(s), joystick(s), trackpad(s), motion sensor(s), cameras(s) or other suitable controller(s).

Problems, however, arise with infotainment or navigation systems that provide responses to vehicle occupant inquiries regarding objects and/or points of interest, because the object or point of interest identification system might fail to detect and/or identify objects or points of interest on a map if the inquiry is regarding objects or points of interest that are outside a search area or range. This failure may occur because a quantity of lanes between a side of a vehicle and a side of the road upon which the vehicle is traveling results in a search range that is not large enough to reach objects beyond the side of the road. For example, if an object is on the right side of the vehicle, the object may be relatively farther from the vehicle or the driver than if the object was on the left side of the vehicle if there are more lanes on the right side of the vehicle than the left side of the vehicle.

The current description includes a method and a system for adjusting a search range for identifying objects of interest to an occupant of a vehicle.

FIG. 1 is a flowchart of a method 100 of adjusting a search range for identifying objects of interest to an occupant of a vehicle, in accordance with one or more embodiments.

Figure 5:
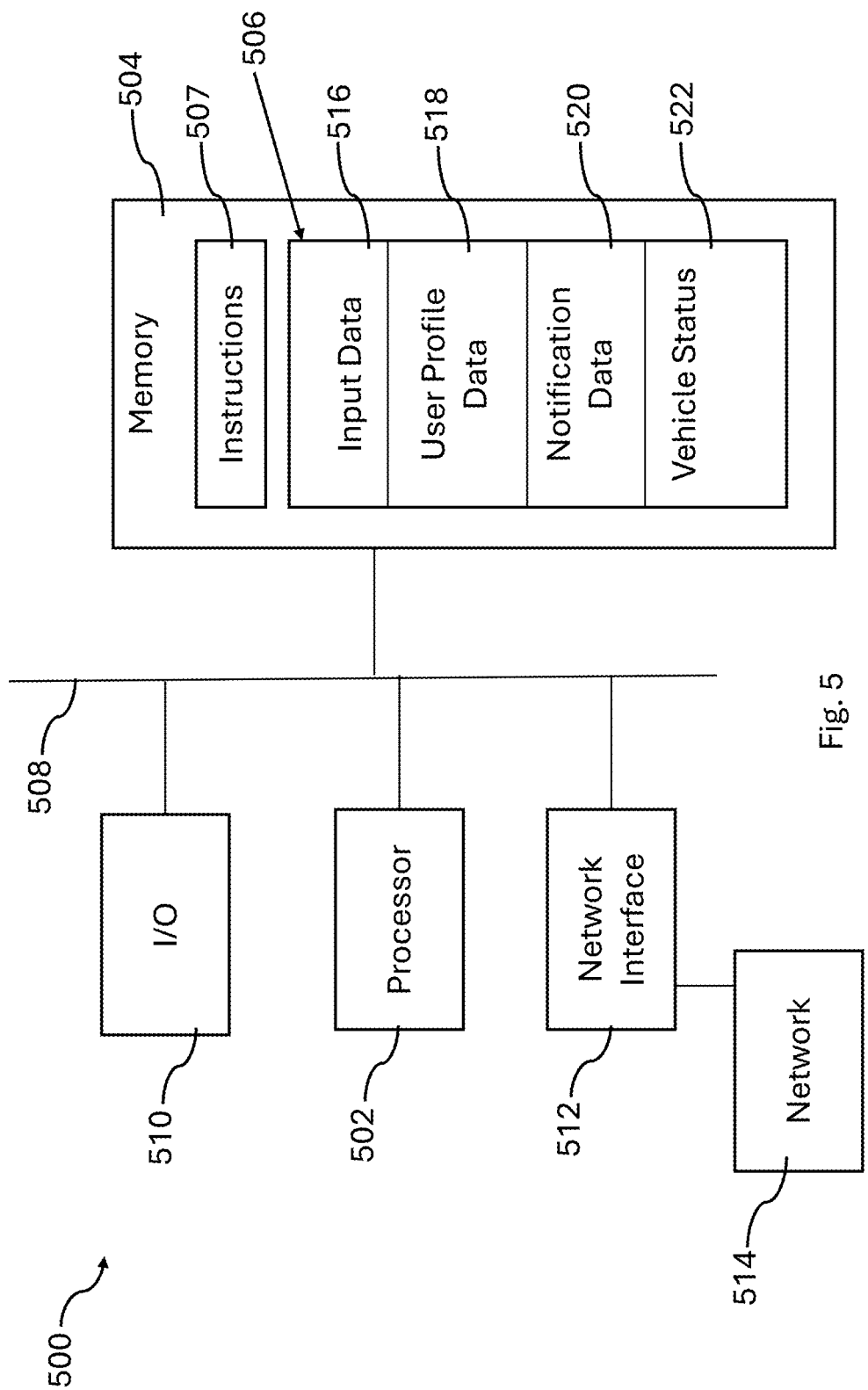
FIG. 5 is a block diagram of a system for adjusting a search range for identifying objects of interest to an occupant of a vehicle, in accordance with one or more embodiments.

In some embodiments, the method 100 is implemented using a system 500 (FIG. 5). In some embodiments, the method 100 is implemented using a system other than the system 500 (FIG. 5).

Figure 2:
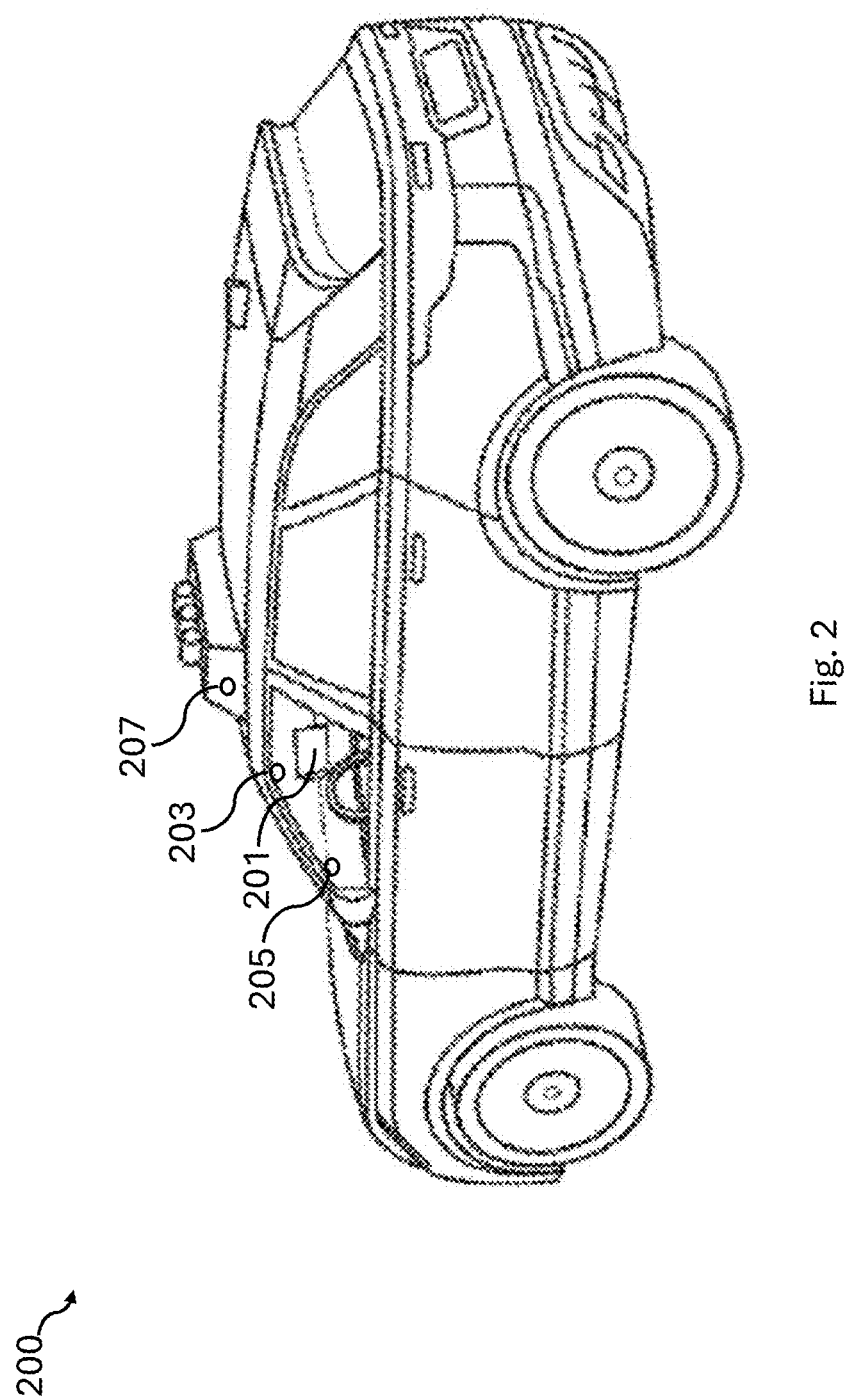
FIG. 2 is a perspective view of a vehicle, in accordance with one or more embodiments.

In some embodiments, the method 100 is implemented in a vehicle 200 (FIG. 2). In some embodiments, the method 100 is implemented in a vehicle other than the vehicle 200 (FIG. 2).

In some embodiments, the method 100 involves detecting an inquiry regarding an object of interest that an occupant of the vehicle sees based on a user input such as a detected pointing motion, gaze direction, verbal inquiry, or some other suitable method by which the occupant of the vehicle is able to communicate with an infotainment or navigation system of a vehicle.

In operation 101, an inquiry to identify an object outside a vehicle is processed. The inquiry is made by an occupant of the vehicle. In some embodiments, the inquiry is based, at least in part, on a detected pointing motion by an occupant of a vehicle. In some embodiments, a gaze direction of an occupant of the vehicle is detected. In some embodiments, the inquiry is based on a verbal command or words spoken out loud by the occupant of the vehicle. In some embodiments, one or more of a direction of the pointing motion or a gaze direction is a direction of occupant focus at the time of receiving the inquiry. In some embodiments, the direction of the occupant focus is based on only the detected pointing motion made by the occupant. In some embodiments, the direction of the occupant focus is based on only the detected gaze of the occupant. In some embodiments, the direction of the occupant focus is based on both the detected pointing motion made by the occupant and the detected gaze of the occupant.

In some embodiments, the occupant of the vehicle is a driver of the vehicle. In some embodiments, the occupant of the vehicle is a passenger of the vehicle. In some embodiments, the driver of the vehicle is seated behind a steering wheel of the vehicle. In some embodiments, the passenger of the vehicle is seated in a seat other than the driver's seat such as a front passenger seat or a rear passenger seat. In some embodiments, an occupant of the vehicle is any passenger of the vehicle that is seated or standing in the vehicle.

In some embodiments, one or more of the pointing motion or gaze direction is detected by one or more sensors or cameras of the vehicle. In some embodiments, sensors or cameras of the vehicle that detect the pointing motion and/or the gaze direction of the occupant of the vehicle are internal sensors or cameras such as sensors or cameras that are facing into a vehicle cabin. In some embodiments, sensors or cameras of the vehicle that detect the pointing motion and/or the gaze direction of the occupant of the vehicle are external facing sensors or cameras such as sensors or cameras that are inside the vehicle cabin that are facing outward from the vehicle cabin. In some embodiments, internal sensors or cameras and external sensors or cameras of the vehicle that detect the pointing motion and/or the gaze direction of the occupant of the vehicle are physically inside the vehicle. In some embodiments, internal sensors or cameras of the vehicle that detect the pointing motion and/or the gaze direction of the occupant of the vehicle are on an exterior of the vehicle facing into the cabin of the vehicle. In some embodiments, external sensors or cameras of the vehicle that detect the pointing motion and/or the gaze direction of the occupant of the vehicle are on an exterior of the vehicle facing away from the cabin of the vehicle. In some embodiments, the pointing motion and/or the gaze direction is detected by a combination of internal sensors or cameras of the vehicle that detect the pointing motion and/or the gaze direction of the occupant of the vehicle and external sensors or cameras of the vehicle that detect the pointing motion and/or the gaze direction of the occupant of the vehicle.

In some embodiments, the verbal command or words spoken by the occupant of the vehicle are among audio data that is context data received by a microphone associated with the vehicle within a preset time period encompassing the pointing motion and/or gaze direction is detected. In some embodiments, the microphone is an in-cabin microphone configured to capture sounds within the cabin of the vehicle. In some embodiments, the microphone is an external microphone configured to capture sounds outside the vehicle. In some embodiments, the microphone is configured to capture voice commands as a user input. In some embodiments, the context data comprises one or more of a conversation between two or more vehicle occupants, a conversation between the occupant of the vehicle and a person outside the vehicle such as by way of a telephone, video call, or other suitable form of communication, a conversation between the occupant of the vehicle and a person outside the vehicle outside the vehicle such as through a window or by way of an external speaker of the vehicle, an inquiry made by a vehicle occupant verbally, music, other sounds, externally captured sounds, or other suitable internal or external audio capable of being captured by one or more microphones associated with the vehicle.

In operation 103, a quantity of lanes of a road upon which the vehicle is travelling is detected. For example, a road may have one lane, two lanes of opposing traffic, three lanes going in one direction and one or more lanes of opposing traffic, no opposing traffic, etc.

In optional operation 105, which lane of the quantity of lanes in which the vehicle is traveling is detected.

In operation 107, one or more search areas extending from the vehicle are set in response to the inquiry. In some embodiments, the one or more search areas are set based on a determined quantity of lanes between the vehicle and a side of the road, wherein the side of the road is ahead in the direction of occupant focus. In some embodiments, In some embodiments, the one or more search areas are set based on a determined quantity of lanes between the vehicle and a first side of the road and a second side of the road opposite to the first side of the road. In some embodiments, the setting of the one or more search areas is further based on the lane within which the vehicle is travelling.

In some embodiments, a first search area extends from the vehicle in a first direction and a second search area extends from the vehicle in a second direction different from the first direction. In some embodiments, the first search area extends toward the first side of the road, and the second search area extends from the vehicle toward the second side of the road.

In response to the first side of the road being closer to the vehicle than the second side of the road based on the quantity of lanes between the vehicle and the first side of the road being less than the quantity of lanes between the vehicle and the second side of the road, the second search area is set to be larger than the first search area.

In response to the first side of the road being farther from the vehicle than the second side of the road based on the quantity of lanes between the vehicle and the first side of the road being greater than the quantity of lanes between the vehicle and the second side of the road, the first search area is set to be larger than the second search area.

In response to the first side of the road and the second side of the road being equidistant from the vehicle based on the quantity of lanes between the vehicle and the first side of the road and the quantity of lanes between the vehicle and the second side of the road being equal, the first search area is set to be equal to the second search area.

In some embodiments, the first search area extends beyond the first side of the road by a first distance, the second search area extends beyond the second side of the road by a second distance, and the first distance is equal to the second distance.

For example, if the vehicle is travelling in the middle lane of a three-lane road with no opposing traffic, there is one lane on each side of the vehicle. If the vehicle is travelling in the left lane of a three-lane road with no opposing traffic, there are two lanes to the right side of the vehicle. If the vehicle is travelling in the right lane of a three-lane road with no opposing traffic, there are two lanes to the left side of the vehicle. Other combinations of quantities of lanes and traffic patterns, including lanes of oncoming traffic, lanes across a median, turning lanes, on-ramps, off-ramps, etc. are capable of being identified and quantified for setting the first search area and/or the second search area.

In some embodiments, the one or more search areas are each a triangle, with an apex of each triangle being at the vehicle.

In some embodiments, the one or more search areas adapt to a vehicle speed and increase in size from a first set size based on an increase in vehicle speed. In some embodiments, the one or more search areas adapt to a vehicle changing lanes and correspondingly increase or decrease in size from a first set size based on a detected lane change.

In some embodiments, one or more of the search areas is decreased in size based on a detected lane change and based on the lane in which the vehicle is traveling. For example, if the vehicle moves to a right side lane and the occupant of the vehicle points to the right side, the search area toward the right side of the vehicle is decreased in size.

Similarly, if the vehicle moves to the right side lane and the occupant of the vehicle points to the left side, the search area toward the left side of the vehicle is increased in size.

In some embodiments, the size of one or more of the search areas is increased gradually until at least one candidate object of interest is identified in map data that is searched for information regarding the candidate object of interest. In some embodiments, the context information is processed as a component for identifying how large the search area should be and/or for identifying when a gradual increase in the search area has achieved a likely candidate object of interest. For example, if the occupant of the vehicle points at a mountain off in the distance and is talking about the mountain, but a store is in the search area between the vehicle and the mountain, the system recognizes that the occupant of the vehicle is inquiring about the mountain and expands the search area to include the mountain off in the distance.

In some embodiments, if the system fails to identify a candidate object of interest or information corresponding to a candidate object of interest based on the context information, the system increases the size of the search area in increments up to a maximum size until a likely candidate object of interest is identified.

In some embodiments, the setting of the one or more search areas comprises adjusting the size of at least one of the one or more search areas based on one or more of a detected lane change, a change in the direction of occupant focus, the speed of the vehicle, a change in the speed of the vehicle, or some other suitable basis for increasing or decreasing a size of a search area.

In operation 109, one or more geographical fences corresponding to the one or more search areas are caused to be set with respect to the vehicle on a geographical map in response to the inquiry.

In some embodiments, all of the first search area and the second search area are included among the search areas corresponding to the one or more geographical fences to identify the candidate object of interest.

In some embodiments, all of the first search area and the second search area included among the search areas corresponding to the one or more geographical fences to identify the candidate object of interest and one or more additional candidate objects of interest surrounding the vehicle at a time of the inquiry.

In some embodiments, the setting of the one or more search areas is caused to include one of the first search area or the second search area based on the direction of the occupant focus, and the system refrains from including one of the first search area or the second search area based on the direction of the occupant focus.

In operation 111, map data associated with the geographical map is searched to identify a candidate object of interest within the one or more geographical fences.

In operation 113, a database is searched for information about the candidate object of interest within the one or more geographical fences.

In operation 115, an output is generated in response to the inquiry comprising the information about the candidate object.

In some embodiments, the output is a graphical user interface that is caused to be output by a display of the vehicle or a mobile device communicatively coupled with the vehicle. In some embodiments, the display is associated with the infotainment system or the navigation system of the vehicle.

In some embodiments, the graphical user interface comprises a geographical map, a location icon indicating a location on the geographical map at which the inquiry was made, a graphical object representing the one or more search areas or the one or more geographical fences, and description information associated with the candidate object of interest. The graphical object extends from the location icon in the graphical user interface.

In some embodiments, the graphical object representing the one or more search areas or the one or more geographical fences is a polygon. In some embodiments, graphical object representing the one or more search areas or the one or more geographical fences is a triangle. In some embodiments, the graphical user interface comprises a three-dimensional display and the graphical object representing the one or more search areas or the one or more geographical fences is a cone or other suitable shape.

One of ordinary skill in the art would recognize that modifications to the method 100 are within the scope of this description. In some embodiments, the method 100 includes at least one additional operation. In some embodiments, an order of operations of the method 100 is adjusted.

FIG. 2 is a perspective view of a vehicle 200, in accordance with some embodiments. The vehicle 200 is capable of implementing the method 100 (FIG. 1). In some embodiments, the vehicle 200 is capable of implementing the method 100 (FIG. 1) using a system 500 (FIG. 5) mounted in the vehicle. In some embodiments, the vehicle 200 is able to implement the method 100 (FIG. 1) based on receiving instructions from the system 500 (FIG. 5) remote or separable from the vehicle 200. In some embodiments where the system 500 (FIG. 5) is remote or separable from the vehicle 200, the vehicle 200 is configured to receive instructions for implementing the method 100 (FIG. 1) either wirelessly or via a wired connection.

The vehicle 200 includes one or more vehicle systems for implementing operations of the vehicle. In some embodiments, the one or more vehicle systems include one or more of an infotainment system or a navigation system having one or more displays 201, one or more internal or external sensors 203, one or more internal or external cameras 205, and at least one camera 207 having a field of view outside the vehicle for taking a photograph. In some embodiments, the vehicle 200 includes the one or more vehicle systems in only the front portion of the vehicle cabin. In some embodiments, the vehicle 200 includes the one or more vehicle systems in both the front portion of the vehicle cabin and the rear portion of the vehicle cabin.

Figure 3:
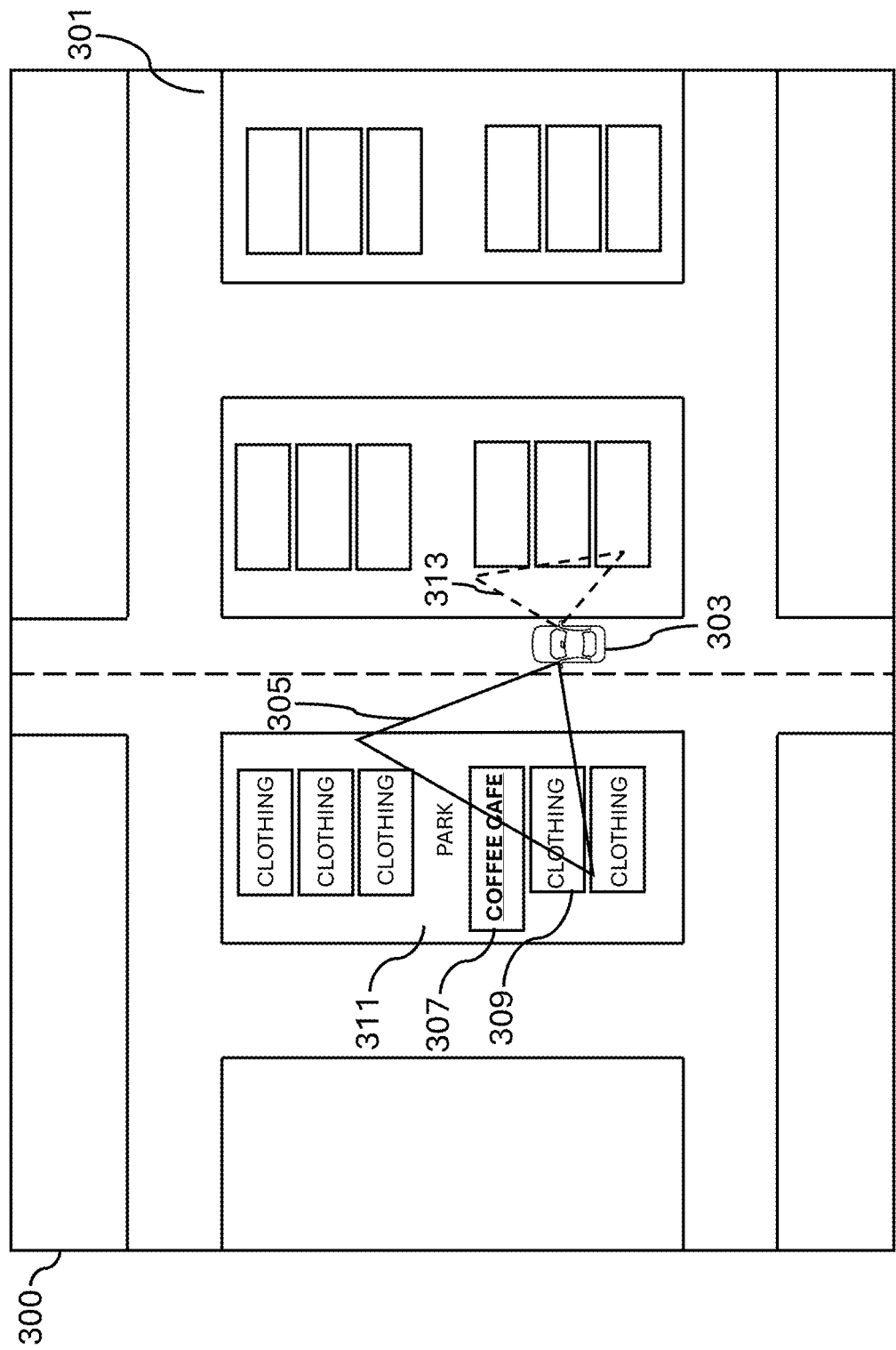
FIG. 3 is a graphical user interface, in accordance with one or more embodiments.

FIG. 3 is a graphical user interface 300, in accordance with one or more embodiments.

Graphical user interface 300 shows a geographical map 301 with a vehicle 303 on the right side of a road. In response to an inquiry made by an occupant of the vehicle 303 that involved a pointing direction and/or gaze direction toward a left side of the road, the search area as represented by graphical object 305 was expanded to encompass candidate objects of interest on the left side of the road such as a coffee café 307, a clothing store 309 and a park 311.

Had the inquiry been made involving a pointing direction and/or gaze direction toward the right side of the road, a hypothetical search area represented by graphical object 313 would be toward potential objects of interest on the right side of the road and smaller than the search area represented by graphical object 305 extending from vehicle 303 to the left side of the road. The number of lanes to the left side of the vehicle 303 is greater than that to the right side of the vehicle 303.

Similarly, had the vehicle 303 been traveling on the left side of the road, the first search area represented by graphical object 305 would be smaller than the search area represented by graphical object 313.

In some embodiments, if the vehicle is traveling on a highway or other multi-lane road, the search area and geofence would be correspondingly increased or decreased based on the quantity of lanes between the vehicle 303 and the side of the road corresponding to the inquiry of the occupant of the vehicle based on the pointing direction and/or the gaze direction. In some embodiments, the search areas and/or geofencing corresponding to the search areas extend in different directions from the vehicle such as left and right, and the sizes of the search areas are adjusted based on the quantity of lanes between the vehicle 303 and the left side of the road and the right side of the road. In some embodiments, if the road has an odd number of lanes and the vehicle 303 is in the middle lane, the first search area and the second search area are set to be equal in size. In some embodiments, if the first search area and the second search area are initially equal in size, but one side of the road has objects that are farther from the edge of the road than the other side, one of the first search area or the second search area is optionally increased until a candidate object of interest is identified.

Figure 4:
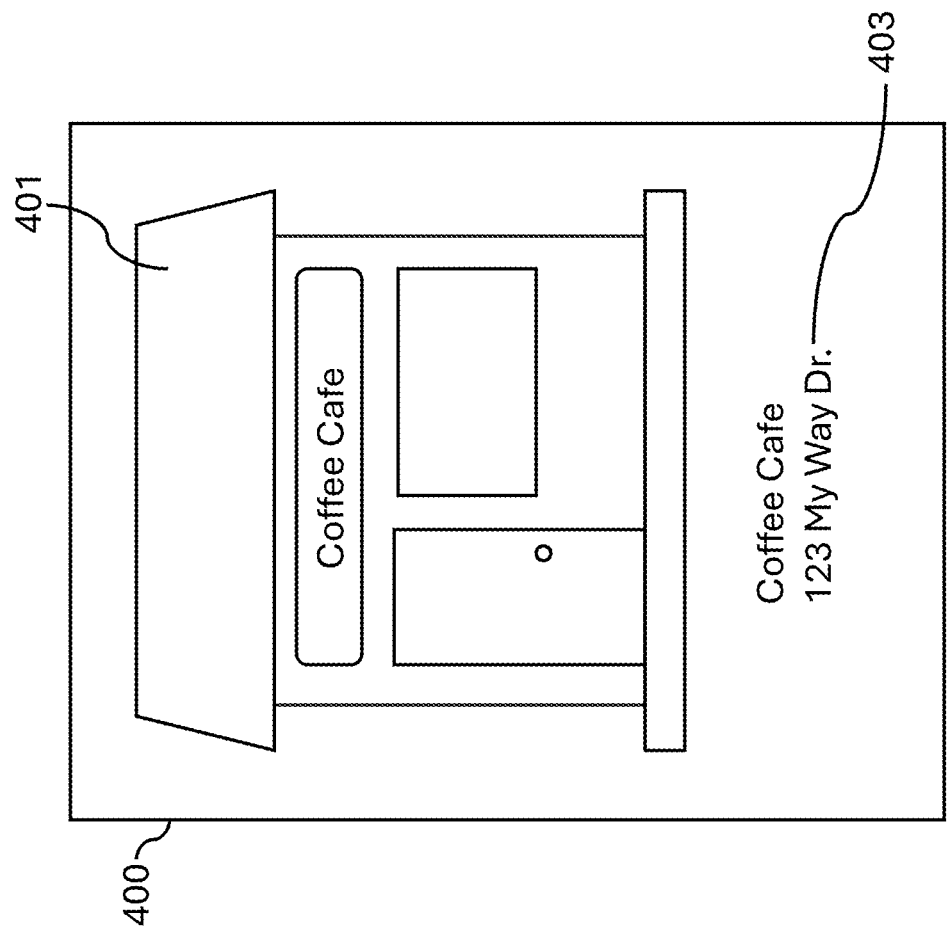
FIG. 4 is a graphical user interface, in accordance with one or more embodiments.

FIG. 4 is a graphical user interface 400, in accordance with one or more embodiments.

Graphical user interface 400 comprises an image of the candidate object of interest 401 which, in this example, is the "Coffee Café" and description information 403 associated with the candidate object of interest. In this example, the description information 403 comprises the name and address of the candidate object of interest. In some embodiments, graphical user interface 400 is displayed based on a user input received by way of graphical user interface 300 (FIG. 3). In some embodiments, graphical user interface 400 is displayed concurrently with graphical user interface 300.

The candidate object of interest 401 in graphical user interface 400 is within the graphical object 305 in graphical user interface 300 and was identified by searching map data according to the geographical fence that was set based on the search area corresponding to the graphical object 305.

FIG. 5 is a block view of a system 500 for adjusting a search range for identifying objects of interest to an occupant of a vehicle, in accordance with one or more embodiments. System 500 includes a hardware processor 502 and a non-transitory, computer readable storage medium 504 encoded with, i.e., storing, the computer program code 506, i.e., a set of executable instructions. Computer readable storage medium 504 is also encoded with instructions 507 for interfacing with manufacturing machines for producing the memory array. The processor 502 is electrically coupled to the computer readable storage medium 504 via a bus 508. The processor 502 is also electrically coupled to an input/output (I/O) interface 510 by bus 508. A network interface 512 is also electrically connected to the processor 502 via bus 508. Network interface 512 is connected to a network 514, so that processor 502 and computer readable storage medium 504 are capable of connecting to external elements via network 514. The processor 502 is configured to execute the computer program code 506 encoded in the computer readable storage medium 504 in order to cause system 500 to be usable for performing a portion or all of the operations as described in method 100 (FIG. 1) or implemented by the vehicle 200 (FIG. 2).

In some embodiments, the processor 502 is a central processing unit (CPU), a multi-processor, a distributed processing system, an application specific integrated circuit (ASIC), and/or a suitable processing unit.

In some embodiments, the computer readable storage medium 504 is an electronic, magnetic, optical, electromagnetic, infrared, and/or a semiconductor system (or apparatus or device). For example, the computer readable storage medium 504 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 504 includes a compact disk-read only memory (CD-ROM), a compact disk-read/write (CD-R/W), and/or a digital video disc (DVD).

In some embodiments, the storage medium 504 stores the computer program code 504 configured to cause system 500 to perform a portion or all of the operations as described in method 100 (FIG. 1) or implemented by the vehicle 200 (FIG. 2). In some embodiments, the storage medium 504 also stores information used for performing a portion or all of the operations as described in method 100 (FIG. 1) or implemented by the vehicle 200 (FIG. 2) as well as information generated during performing a portion or all of the operations as described in method 100 (FIG. 1) or implemented by the vehicle 200 (FIG. 2), such as an input data parameter 516, a user profile parameter 518, a notification data parameter 520, a vehicle status parameter 522, and/or a set of executable instructions to perform the operation of a portion or all of the operations as described in method 100 (FIG. 1) or implemented by the vehicle 200 (FIG. 2).

In some embodiments, the storage medium 504 stores instructions 507 for interfacing with external devices, e.g., mobile devices. The instructions 507 enable processor 502 to generate or receive instructions readable by the external devices during implementation of a portion or all of the operations as described in method 100 (FIG. 1) or implemented by the vehicle 200 (FIG. 2).

System 500 includes I/O interface 510. I/O interface 510 is coupled to external circuitry. In some embodiments, I/O interface 510 includes a keyboard, keypad, mouse, trackball, trackpad, touch screen and/or cursor direction keys for communicating information and commands to processor 502.

System 500 also includes network interface 512 coupled to the processor 502. Network interface 512 allows system 500 to communicate with network 514, to which one or more other computer systems are connected. Network interface 512 includes wireless network interfaces such WiFi, Bluetooth®, WiMAX, GPRS, or WCDMA; wired network interface such as a LAN, Ethernet, WAN, USB, IEEE-1394, or other suitable network interface. In some embodiments, a portion or all of the operations as described in method 100 (FIG. 1) or implemented by the vehicle 200 (FIG. 2) is implemented in two or more systems 500, and information such as sensor data, window transmission rate, forecast information or vehicle status are exchanged between different systems 500 via network 514.

Supplemental Note 1

An aspect of this description relates to a method. The method comprises processing an inquiry to identify an object outside a vehicle, the inquiry being made by an occupant of the vehicle. The method also comprises determining a direction of occupant focus at a time of receiving the inquiry. The method further comprises detecting a quantity of lanes of a road upon which the vehicle is travelling. The method additionally comprises setting one or more search areas extending from the vehicle in response to the inquiry and based on a determined quantity of lanes between the vehicle and a side of the road, wherein the side of the road is ahead in the direction of occupant focus. The method also comprises causing one or more geographical fences corresponding to the one or more search areas to be set with respect to the vehicle on a geographical map in response to the inquiry. The method further comprises searching map data associated with the geographical map to identify a candidate object of interest within the one or more geographical fences. The method additionally comprises searching a database for information about the candidate object of interest within the one or more geographical fences. The method also comprises generating an output in response to the inquiry comprising the information about the candidate object.

Supplemental Note 2

The method according to Supplemental Note 1, wherein the one or more search areas comprise one of a first search area extending from the vehicle in a first direction or a second search area extending from the vehicle in a second direction different from the first direction, and the method further comprises: causing the setting of the one or more search areas to include the one of the first search area or the second search area based on the direction of occupant focus; and refraining from including the other of the first search area or the second search area based on the direction of occupant focus.

Supplemental Note 3

The method according to Supplemental Note 1 or Supplemental Note 2, wherein the direction of the occupant focus is based on a detected pointing motion made by the occupant.

Supplemental Note 4

The method according to any of Supplemental Note 1-3, wherein the direction of the occupant focus is based on a detected gaze of the occupant.

Supplemental Note 5

The method according to any of Supplemental Note 1-4, wherein the one or more search areas comprise at least two search areas including a first search area extending from the vehicle in a first direction or a second search area extending from the vehicle in a second direction different from the first direction, and all of the first search area and the second search area are included among the search areas corresponding to the one or more geographical fences to identify the candidate object of interest.

Supplemental Note 6

The method according to Supplemental Note 5, further comprising: adjusting a size of the first search area and a size of the second search area based on one or more of a change in the direction of occupant focus or a detected lane change.

Supplemental Note 7

The method according to any of Supplemental Note 1-6, wherein the one or more search areas comprise at least two search areas including a first search area extending from the vehicle toward a first side of the road and a second search area extending from the vehicle toward a second side of the road, the first search area extends beyond the first side of the road by a first distance, the second search area extends beyond the second side of the road by a second distance, and the first distance is equal to the second distance.

Supplemental Note 8

The method according to any of Supplemental Note 1-7, wherein the one or more search areas are each a triangle, with an apex of each triangle being at the vehicle.

Supplemental Note 9

The method according to any of Supplemental Note 1-8, wherein the one or more search areas adapt to a vehicle speed and increase in size from a first set size based on an increase in vehicle speed.

Supplemental Note 10

The method according to any of Supplemental Note 1-9, wherein the one or more search areas adapt to a vehicle changing lanes and correspondingly increase or decrease in size from a first set size based on a detected lane change.

Supplemental Note 11

An aspect of this description relates to an apparatus. The apparatus includes a processor and a memory having instructions stored thereon that, when executed by the processor, cause the apparatus to process an inquiry to identify an object outside a vehicle, the inquiry being made by an occupant of the vehicle. The apparatus is also caused to determine a direction of occupant focus at a time of receiving the inquiry. The apparatus is further caused to detect a quantity of lanes of a road upon which the vehicle is travelling. The apparatus is additionally caused to set one or more search areas extending from the vehicle in response to the inquiry and based on a determined quantity of lanes between the vehicle and a side of the road, wherein the side of the road is ahead in the direction of occupant focus. The apparatus is also caused to cause one or more geographical fences corresponding to the one or more search areas to be set with respect to the vehicle on a geographical map in response to the inquiry. The apparatus is further caused to search map data associated with the geographical map to identify a candidate object of interest within the one or more geographical fences. The apparatus is additionally caused to search a database for information about the candidate object of interest within the one or more geographical fences. The apparatus is also caused to generate an output in response to the inquiry comprising the information about the candidate object.

Supplemental Note 12

The apparatus according to Supplemental Note 11, wherein the one or more search areas comprise one of a first search area extending from the vehicle in a first direction or a second search area extending from the vehicle in a second direction different from the first direction, and the apparatus is further caused to: cause the setting of the one or more search areas to include the one of the first search area or the second search area based on the direction of occupant focus; and refrain from including the other of the first search area or the second search area based on the direction of occupant focus.

Supplemental Note 13

The apparatus according to Supplemental Note 11 or Supplemental Note 12, wherein the direction of the occupant focus is based on a detected pointing motion made by the occupant.

Supplemental Note 14

The apparatus according to any of Supplemental Note 11-13, wherein the direction of the occupant focus is based on a detected gaze of the occupant.

Supplemental Note 15

The apparatus according to any of Supplemental Note 11-14, wherein the one or more search areas comprise at least two search areas including a first search area extending from the vehicle in a first direction or a second search area extending from the vehicle in a second direction different from the first direction, and all of the first search area and the second search area are included among the search areas corresponding to the one or more geographical fences to identify the candidate object of interest.

Supplemental Note 16

The apparatus according to any of Supplemental Note 15, the apparatus is further caused to: adjust a size of the first search area and a size of the second search area based on one or more of a change in the direction of occupant focus or a detected lane change.

Supplemental Note 17

The apparatus of Supplemental Note 11-16, wherein the one or more search areas comprise at least two search areas including a first search area extending from the vehicle toward a first side of the road and a second search area extending from the vehicle toward a second side of the road, the first search area extends beyond the first side of the road by a first distance, the second search area extends beyond the second side of the road by a second distance, and the first distance is equal to the second distance.

The apparatus of Supplemental Note 11-17, wherein the one or more search areas adapt to a vehicle speed and increase in size from a first set size based on an increase in vehicle speed.

The apparatus of Supplemental Note 11-18, wherein the one or more search areas adapt to a vehicle changing lanes and correspondingly increase or decrease in size from a first set size based on a detected lane change.

Supplemental Note 20

An aspect of this description relates to a non-transitory computer readable medium having instructions stored thereon that, when executed by the processor, cause an apparatus to process an inquiry to identify an object outside a vehicle, the inquiry being made by an occupant of the vehicle. The apparatus is also caused to determine a direction of occupant focus at a time of receiving the inquiry. The apparatus is further caused to detect a quantity of lanes of a road upon which the vehicle is travelling. The apparatus is additionally caused to set one or more search areas extending from the vehicle in response to the inquiry and based on a determined quantity of lanes between the vehicle and a side of the road, wherein the side of the road is ahead in the direction of occupant focus. The apparatus is also caused to cause one or more geographical fences corresponding to the one or more search areas to be set with respect to the vehicle on a geographical map in response to the inquiry. The apparatus is further caused to search map data associated with the geographical map to identify a candidate object of interest within the one or more geographical fences. The apparatus is additionally caused to search a database for information about the candidate object of interest within the one or more geographical fences. The apparatus is also caused to generate an output in response to the inquiry comprising the information about the candidate object.

What is claimed is:

1. A method, comprising:
    processing an inquiry to identify an object outside a vehicle, the inquiry being made by an occupant of the vehicle;
    determining a direction of occupant focus at a time of receiving the inquiry;
    detecting a quantity of lanes of a road upon which the vehicle is travelling;
    setting one or more search areas extending from the vehicle in response to the inquiry and based on a determined quantity of lanes between the vehicle and a side of the road, wherein the side of the road is ahead in the direction of occupant focus;
    causing one or more geographical fences corresponding to the one or more search areas to be set with respect to the vehicle on a geographical map in response to the inquiry;
    searching map data associated with the geographical map to identify a candidate object of interest within the one or more geographical fences;
    searching a database for information about the candidate object of interest within the one or more geographical fences; and
    generating an output in response to the inquiry comprising the information about the candidate object.

2. The method of claim 1, wherein the one or more search areas comprise one of a first search area extending from the vehicle in a first direction or a second search area extending from the vehicle in a second direction different from the first direction, and the method further comprises:
    causing the setting of the one or more search areas to include the one of the first search area or the second search area based on the direction of occupant focus; and
    refraining from including the other of the first search area or the second search area based on the direction of occupant focus.

3. The method of claim 1, wherein the direction of occupant focus is based on a detected pointing motion made by the occupant of the vehicle.

4. The method of claim 1, wherein the direction of occupant focus is based on a detected gaze of the occupant of the vehicle.

5. The method of claim 1, wherein the one or more search areas comprise at least two search areas including a first search area extending from the vehicle in a first direction or a second search area extending from the vehicle in a second direction different from the first direction, and all of the first search area and the second search area are included among the search areas corresponding to the one or more geographical fences to identify the candidate object of interest.

6. The method of claim 5, further comprising:
    adjusting a size of the first search area and a size of the second search area based on one or more of a change in the direction of occupant focus or a detected lane change.

7. The method of claim 1, wherein the one or more search areas comprise at least two search areas including a first search area extending from the vehicle toward a first side of the road and a second search area extending from the vehicle toward a second side of the road, the first search area extends beyond the first side of the road by a first distance, the second search area extends beyond the second side of the road by a second distance, and the first distance is equal to the second distance.

8. The method of claim 1, wherein the one or more search areas are each a triangle, with an apex of each triangle being at the vehicle.

9. The method of claim 1, wherein the one or more search areas adapt to a vehicle speed and increase in size from a first set size based on an increase in vehicle speed.

10. The method of claim 1, wherein the one or more search areas adapt to a vehicle changing lanes and correspondingly increase or decrease in size from a first set size based on a detected lane change.

11. An apparatus, comprising:
    a processor; and
    a memory having instructions stored thereon that, when executed by the processor, cause the apparatus to:
    process an inquiry to identify an object outside a vehicle, the inquiry being made by an occupant of the vehicle;
    determine a direction of occupant focus at a time of receiving the inquiry;
    detect a quantity of lanes of a road upon which the vehicle is travelling;
    set one or more search areas extending from the vehicle in response to the inquiry and based on a determined quantity of lanes between the vehicle and a side of the road, wherein the side of the road is ahead in the direction of occupant focus;
    cause one or more geographical fences corresponding to the one or more search areas to be set with respect to the vehicle on a geographical map in response to the inquiry;
    search map data associated with the geographical map to identify a candidate object of interest within the one or more geographical fences;
    search a database for information about the candidate object of interest within the one or more geographical fences; and
    generate an output in response to the inquiry comprising the information about the candidate object.

12. The apparatus of claim 11, wherein the one or more search areas comprise one of a first search area extending from the vehicle in a first direction or a second search area extending from the vehicle in a second direction different from the first direction, and the apparatus is further caused to:
    cause the setting of the one or more search areas to include the one of the first search area or the second search area based on the direction of occupant focus; and
    refrain from including the other of the first search area or the second search area based on the direction of occupant focus.

13. The apparatus of claim 11, wherein the direction of the occupant focus is based on a detected pointing motion made by the occupant.

14. The apparatus of claim 11, wherein the direction of the occupant focus is based on a detected gaze of the occupant.

15. The apparatus of claim 11, wherein the one or more search areas comprise at least two search areas including a first search area extending from the vehicle in a first direction or a second search area extending from the vehicle in a second direction different from the first direction, and all of the first search area and the second search area are included among the search areas corresponding to the one or more geographical fences to identify the candidate object of interest.

16. The apparatus of claim 15, wherein the apparatus is further caused to:
adjust a size of the first search area and a size of the second search area based on one or more of a change in the direction of occupant focus or a detected lane change.

17. The apparatus of claim 11, wherein the one or more search areas comprise at least two search areas including a first search area extending from the vehicle toward a first side of the road and a second search area extending from the vehicle toward a second side of the road, the first search area extends beyond the first side of the road by a first distance, the second search area extends beyond the second side of the road by a second distance, and the first distance is equal to the second distance.

18. The apparatus of claim 11, wherein the one or more search areas adapt to a vehicle speed and increase in size from a first set size based on an increase in vehicle speed.

19. The apparatus of claim 11, wherein the one or more search areas adapt to a vehicle changing lanes and correspondingly increase or decrease in size from a first set size based on a detected lane change.

20. A non-transitory computer readable storage medium having instructions stored thereon that, when executed by a processor, cause an apparatus to:
process an inquiry to identify an object outside a vehicle, the inquiry being made by an occupant of the vehicle;
determine a direction of occupant focus at a time of receiving the inquiry;
detect a quantity of lanes of a road upon which the vehicle is travelling;
set one or more search areas extending from the vehicle in response to the inquiry and based on a determined quantity of lanes between the vehicle and a side of the road, wherein the side of the road is ahead the direction of occupant focus;
cause one or more geographical fences corresponding to the one or more search areas to be set with respect to the vehicle on a geographical map in response to the inquiry;
search map data associated with the geographical map to identify a candidate object of interest within the one or more geographical fences;
search a database for information about the candidate object of interest within the one or more geographical fences; and
generate an output in response to the inquiry comprising the information about the candidate object.

* * * * *